(12) United States Patent
Brück

(10) Patent No.: US 8,845,973 B2
(45) Date of Patent: Sep. 30, 2014

(54) PARTICLE FILTER WITH HYDROLYSIS COATING, DEVICE AND MOTOR VEHICLE

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 979 days.

(21) Appl. No.: 12/942,468

(22) Filed: Nov. 9, 2010

(65) Prior Publication Data

US 2011/0107748 A1    May 12, 2011

Related U.S. Application Data

(63) Continuation of application No. PCT/EP2009/055167, filed on Apr. 29, 2009.

(30) Foreign Application Priority Data

May 9, 2008 (DE) .......... 10 2008 022 990

(51) Int. Cl.
    *B01D 50/00* (2006.01)
(52) U.S. Cl.
    USPC .......................................... 422/177; 422/180
(58) Field of Classification Search
    USPC .................................... 422/177, 180; 55/523
    See application file for complete search history.

(56) References Cited

U.S. PATENT DOCUMENTS

| 6,620,391 | B2 | 9/2003 | Müller et al. |
| 6,713,031 | B2 | 3/2004 | Harris et al. |
| 7,267,805 | B2 | 9/2007 | Brück et al. |
| 7,311,749 | B2 | 12/2007 | Bardon et al. |
| 7,563,414 | B2 | 7/2009 | Brueck |
| 7,666,376 | B2 | 2/2010 | Dornseiffer et al. |
| 7,727,498 | B2 | 6/2010 | Hodgson et al. |
| 7,882,697 | B2 | 2/2011 | Ichikawa |
| 2007/0128088 | A1* | 6/2007 | Willey et al. .............. 422/171 |
| 2009/0092525 | A1* | 4/2009 | Ichikawa .................. 422/177 |
| 2010/0037609 | A1 | 2/2010 | Konieczny et al. |

FOREIGN PATENT DOCUMENTS

| CN | 1774565 A | 5/2006 |
| DE | 10020170 C1 | 9/2001 |
| DE | 10 2005 012 066 A1 | 9/2006 |
| DE | 10 2007 006 625 A1 | 8/2008 |
| EP | 1 153 648 A1 | 11/2001 |

(Continued)

OTHER PUBLICATIONS

International Search Report of PCT/EP2009/055167, Dated Sep. 16, 2009.

*Primary Examiner* — Tom Duong
(74) *Attorney, Agent, or Firm* — Laurence A. Greenberg; Werner H. Stemer; Ralph E. Locher

(57) ABSTRACT

A particle filter includes channels that are formed by porous walls and run between a first end face and a second end face of the particle filter. The first end face has a hydrolysis coating outside the channels. A device includes at least one exhaust gas line through which an exhaust gas can flow in a flow direction, a nozzle for introducing a reducing agent containing or forming ammonia, and the aforementioned particle filter. The first end face of the particle filter is oriented towards the nozzle. A motor vehicle having the particle filter or the device, is also provided.

15 Claims, 2 Drawing Sheets

(56) References Cited

FOREIGN PATENT DOCUMENTS

| | | |
|---|---|---|
| EP | 1285153 B1 | 1/2008 |
| JP | 2002339728 A | 11/2002 |
| JP | 2004060494 A | 2/2004 |
| JP | 2006508788 A | 3/2006 |
| JP | 2006183507 A | 7/2006 |
| JP | 2008051089 A | 3/2008 |
| WO | 97/01387 A1 | 1/1997 |
| WO | 03002853 A2 | 1/2003 |

* cited by examiner

PARTICLE FILTER WITH HYDROLYSIS COATING, DEVICE AND MOTOR VEHICLE

CROSS-REFERENCE TO RELATED APPLICATION

This is a continuation, under 35 U.S.C. §120, of copending International Application No. PCT/EP2009/055167, filed Apr. 29, 2009, which designated the United States; this application also claims the priority, under 35 U.S.C. §119, of German Patent Application DE 10 2008 022 990.3, filed May 9, 2008; the prior applications are herewith incorporated by reference in their entirety.

BACKGROUND OF THE INVENTION

Field of the Invention

The present invention relates to a particle filter having channels which are formed from porous walls and which run between a first end side and a second end side of the particle filter. Such particle filters are used, in particular, in exhaust systems of mobile internal combustion engines, such as for example in motor vehicles. The invention also relates to a device having the particle filter and a motor vehicle having the particle filter or the device.

The particle filter mentioned herein is formed, in particular, from a porous and, if appropriate, extruded structure, for example in the form of a honeycomb structure. There are no particular restrictions with regard to the shape of the honeycomb structure. It is, however, possible for an outer cross-sectional shape of the honeycomb structure to be, for example, in the form of a circle, an ellipse or an oval. There are likewise no restrictions with regard to the shape of the channels, but an angular cross-sectional shape is generally preferable, for example in the form of a triangle, a square, a hexagon or the like. The cell density for the channels may likewise be varied within wide limits. A construction is, for example, preferable with a channel density in the range of from 50 to 400 cells per square inch (7.8 to 62 cells per square centimeter). In that case, the porous walls may, for example, be formed from ceramic. In that case, silicon carbide or silicon metal and silicon carbide have, for example, proven to be suitable. If the ceramic has a silicon metal and silicon carbide as a main crystalline phase, the Si content defined by Si (Si+SiC) preferably amounts to 5 to 50% by weight, preferably 10 to 40% by weight.

Such particle filters are often referred to as "wall-flow filters" because they force at least a substantial part of the exhaust-gas flow to pass through the porous walls. For that purpose, it is known for the adjacently-disposed channels of the particle filter to be closed off at the two end sides in an alternating manner, in such a way that a partial exhaust-gas flow can flow into a first channel open at the inlet side, is forced through the porous wall into an adjacent channel due to the closure at the end of the first channel, and can flow out of the adjacent channel. As the flow passes through the porous walls, it is also possible for particles entrained in the exhaust gas to be accumulated and possibly reduced or converted into gaseous constituents.

Such particle filters having porous walls often have a particularly large internal surface area, in such a way that it is possible in that case, with a corresponding coating, to provide a very large catalytically active surface in a relatively small structural volume. Therefore, the use of such particle filters, preferably in combination with an SCR system, is also proposed. In selective catalytic reduction (SCR of nitrogen oxides in exhaust gases), the nitrogen oxides (NO, $NO_2$) are preferably reduced while undesired secondary reactions (such as for example the oxidation of sulfur oxide to form sulfur trioxide) are substantially suppressed. Ammonia ($NH_3$) which is admixed to the exhaust gas is often used for the process of that reaction. The products of the reaction are water ($H_2O$) and nitrogen ($N_2$). Suitable catalysts used in that case are, for example, titanium dioxide, vanadium pentoxide and/or tungsten oxide. The use of zeolites is also possible. The SCR process is used, in particular, in diesel vehicles, primarily in utility vehicles, in order to reduce pollutant emissions with regard to nitrogen oxide loading.

The systems heretofore proposed firstly for particle reduction and secondly for nitrogen oxide reduction are in part of highly complex construction and require a large amount of installation space. Furthermore, for some systems, it is necessary for cumbersome conditioning of the reducing agent (for example urea or the like) to take place outside the exhaust gas and/or in the exhaust system itself, wherein a complete conversion sometimes cannot be ensured. The provision of a so-called blocking catalytic converter is therefore often also proposed, which is intended to prevent a breakthrough of nitrogen oxides in the event of an inadequate conversion of the reducing agent.

SUMMARY OF THE INVENTION

It is accordingly an object of the invention to provide a particle filter with a hydrolysis coating, a device and a motor vehicle, which overcome the hereinafore-mentioned disadvantages and at least partially solve the highlighted problems of the heretofore-known devices of this general type. In particular, the particle filter, specifically in SCR systems, should offer advantages with regard to the complete conversion of SCR reactions or hydrolysis of reducing agents. Furthermore, a corresponding device for realizing the SCR process in motor vehicles should have a compact and simple construction.

With the foregoing and other objects in view there is provided, in accordance with the invention, a particle filter, comprising a first end side and a second end side, porous walls forming channels extending between the first end side and the second end side and a hydrolysis coating disposed at the first end side outside the channels.

The hydrolysis coating preferably includes titanium dioxide as the most important (or even only) active component, in such a way that, in particular, a small ammonia storage volume is provided. If appropriate, however, it is also possible to use tungsten dioxide and vanadium-tungsten oxide catalysts applied to titanium oxide. The coating has, in particular, the property of converting, that is to say hydrolyzing, a urea-containing reducing agent together with hot exhaust gas and water to form ammonia (and isocyanic acid). In this case, (only) the first end side is (also) provided with a hydrolysis coating outside the channels. In this case, the first end side means substantially the surface which one recognizes as the first end side in a plan view, and which is thus, in particular, positioned outside the channels. In specifically the type of particle filters having porous walls, the first end side, which is impinged on by the exhaust gas, is relatively large. Furthermore, it must be taken into consideration that the first end side possibly serves as an impingement surface for the reducing agent. In order to now realize as complete a conversion of the reducing agent as possible in this case, a hydrolysis coating is provided at the outside, specifically in the region of the first end side. Upon the impact of the reducing agent, which is for example in liquid form, and the subsequent contact thereof with the hot exhaust gas, the reducing agent is converted as comprehensively as possible to ammonia, in such a way that a complete SCR reaction possibly takes place subsequently in the interior of the particle filter. The hydrolysis coating may self-evidently also be formed so as to project into the open and/or closed channel, for example over the length of the closure device (10-40 mm), in such a way that if appropriate a coating can be produced in a simple manner by dipping of the end side.

In accordance with another feature of the invention, in this case, it is preferable for first closure devices for channels to be provided on the first end side. The first closure devices, with their front surfaces, form a part of the first end side of the particle filter, with the front surfaces being formed with a hydrolysis coating. The closure devices are, for example, plugs which are positioned in the region of the first end side of the particle filter in order to close off some of the channels at the first end side. In this case, the front surfaces of the first closure devices, which possibly extend partially into the channels, point outwards and may, in particular, be impinged on by the exhaust gas during later use. Specifically in this case, therefore, more than 50% of the entire end surface of the particle filter (end side plus channels) is formed with a hydrolysis coating.

In accordance with a further feature of the invention, it is also proposed that second closure devices for channels be provided on the second end side. The second closure devices, with their base surfaces, delimit channels, and the base surfaces are formed with a hydrolysis coating. The second closure devices, which are generally positioned in those channels in which no first closure devices are provided, are usually positioned flush on the second end side. The second closure devices now form a base surface, with the base surface usually being positioned in the interior of the channels. In this case, the base surfaces of the second closure devices generally point in the same direction as the front surfaces of the first closure devices. The base surfaces can thereby also serve as impingement surfaces for reducing agent and/or the exhaust gas. It is thus proposed in this case that a hydrolysis coating likewise be provided in such a way that the reducing agent droplets presently flying through such a channel impinge thereon and are hydrolyzed.

In accordance with an added feature of the invention, it is proposed that the particle filter have channels of a predefined length, with the channels being formed with a hydrolysis coating over a first section of the length, and with the first section extending up to the second end side of the particle filter. Therefore, in particular that section of the channels which is disposed downstream is formed with a hydrolysis coating. In particular, the first section extends up to the base surfaces of the second closure devices. The first section preferably covers in the range of 10% to 70% of the length of the channels.

In accordance with an additional feature of the invention, it is also considered to be advantageous that the channels have a length, with the channels being provided with an SCR coating over a second section of the length, and with the second section being disposed between the first end side and the second end side of the particle filter. In other words, this means in particular that the SCR coating is positioned with a considerable spacing to the first end side and to the second end side of the particle filter. This relates, in particular, to the situation in which an SCR coating is realized in those channels which do not have first closure devices at the first end side. Merely for the sake of completeness, it is pointed out that the channels may also make do without an SCR coating, that is to say, in particular, may also have non-coated sections.

An SCR coating over a second section is, however, preferably provided (only) in each channel which does not have a second closure device at the second end side. The channels may, however, have an SCR coating over the entire length. An SCR coating has a higher ammonia storage capacity than a hydrolysis coating, in particular because additional components such as vanadium pentoxide and/or zeolites are provided.

In accordance with yet another feature of the invention, for the situation mentioned in the introduction, but in particular for the above situation, in which an SCR coating is provided in a second section in channels which do not have first closure devices at the first end side, it is preferable for the channels to be formed with a hydrolysis coating over a third section of the length, and for the third section to extend up to the first end side of the particle filter. In this way, an inlet region of the channels adjacent the first end side is practically likewise formed with a hydrolysis coating. The hydrolysis coating may serve, in particular, as an impingement surface for reducing agent if an oblique impingement of the reducing agent close to the first end side is realized.

In accordance with yet a further feature of the invention, it is proposed that at least some of the channels be at least partially curved or provided with structures which project into the channels. A "curved" profile means in particular a corrugated shape of the porous walls, so as to provide, for example, a meandering channel profile. It is likewise also possible for helically shaped channels to be formed. It is also possible, if appropriate, to additionally form structures which project into the channels. The structures may be formed in the manner of guide surfaces, channel constrictions or the like.

In accordance with yet an added feature of the invention, an oxidizing coating may be provided in the outlet region of those channels which are open toward the second end side. Such an oxidizing coating includes, in particular, platinum and preferably covers that region (for example 10-40 mm) which the exhaust gas comes into contact with last before it leaves the particle filter.

With the objects of the invention in view, there is also provided a device, comprising at least one exhaust line for conducting an exhaust gas flow in a flow direction, a nozzle for introducing a reducing agent including or forming ammonia, and a particle filter according to the invention. The first end side of the particle filter is directed toward the nozzle.

The nozzle is, in particular, a nozzle through which liquid reducing agent can be injected. The reducing agent may itself include ammonia, but it is also possible for the reducing agent to form ammonia and to only (partially) include a precursor. It is very particularly preferable for the reducing agent to include liquid urea. The particle filter described according to the invention should now be positioned in the exhaust line in such a way that the approaching exhaust gas to be purified impinges on the first end side of the particle filter together with the reducing agent. The mixture composed of reducing agent and exhaust gas may now realize a more complete hydrolysis of the reducing agent, in particular at the first end side.

In accordance with another feature of the invention, in this context, it is also considered to be advantageous for the nozzle to be positioned with an injection direction which is aligned obliquely with respect to the first end side or the flow direction of the exhaust gas. If appropriate, an oblique configuration both with respect to the first end side and also with respect to the flow direction is particularly advantageous in order to realize a uniform distribution of the reducing agent over the first end side and to thereby realize close contact with the hydrolysis coating there.

In accordance with a further feature of the invention, an oxidation catalytic converter may be provided in the exhaust line. The oxidation catalytic converter is positioned upstream of the nozzle as viewed in the flow direction of the exhaust gas, and is at a distance of at least 150 mm from the particle filter. The oxidation catalytic converter serves, for example, as a source for nitrogen dioxide ($NO_2$) which can continuously convert the particles (soot) trapped in the particle filter, and thereby prevent the porous walls of the particle filter from becoming blocked. In order to provide for an adequate distribution of oxidizing agents ($NO_2$) and reducing agents, the oxidation catalytic converter should, if possible, be positioned upstream in the exhaust line at the specified distance from the particle filter.

The invention is very particularly preferably used in a motor vehicle. Therefore, with the objects of the invention in view, there is concomitantly provided a motor vehicle, comprising an internal combustion engine and an exhaust system. The exhaust system has at least one particle filter described according to the invention or a device of the type described above.

Other features which are considered as characteristic for the invention are set forth in the appended claims, noting that the features specified individually in the dependent claims may be combined with one another in any desired technologically expedient manner and form further embodiments of the invention.

Although the invention is illustrated and described herein as embodied in a particle filter with a hydrolysis coating and a device and a motor vehicle having a particle filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
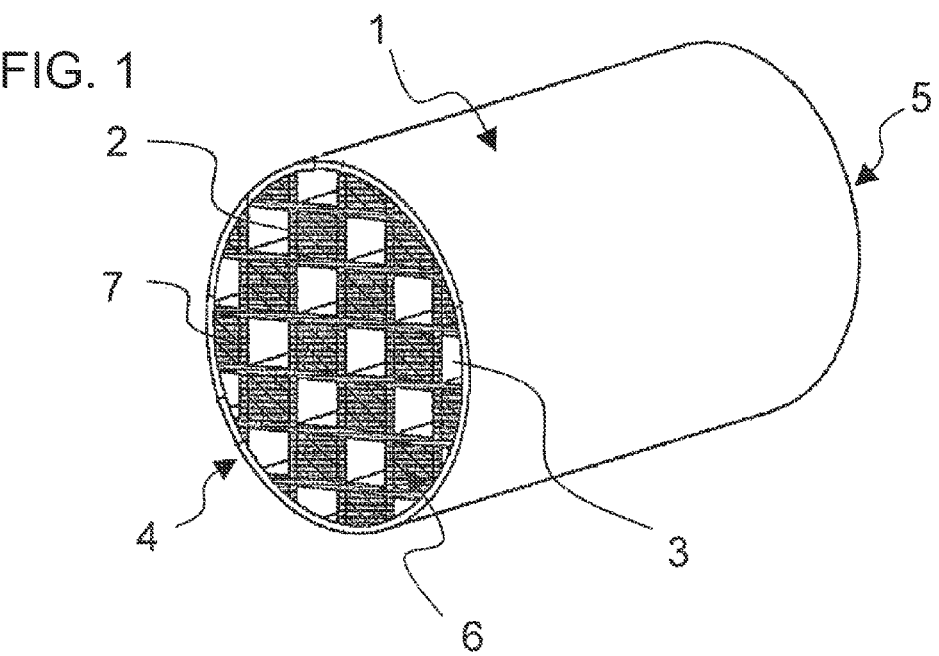
FIG. 1 is a diagrammatic, perspective view of a structural variant of a particle filter according to the invention.

Referring now in detail to the figures of the drawings, which show particularly preferred structural variants to which the invention is not restricted, and first, particularly, to FIG. 1 thereof, there is seen a perspective illustration of a particle filter 1 having a round cross section. The particle filter 1 is formed from extruded ceramic material with porous walls 2, forming a multiplicity of channels 3. The particle filter 1, which has a cylindrical shape, has a first end side 4 and a second end side 5, between which the channels 3 extend rectilinearly. The channels 3 are closed off at the end sides in an alternating manner. It is possible in this case to see a first closure device 7 for some of the channels 3. In this case, all components forming the first end side 4 (webs of the porous walls 2 and front surfaces of the first closure device 7) have a hydrolysis coating 6.

Figure 2:
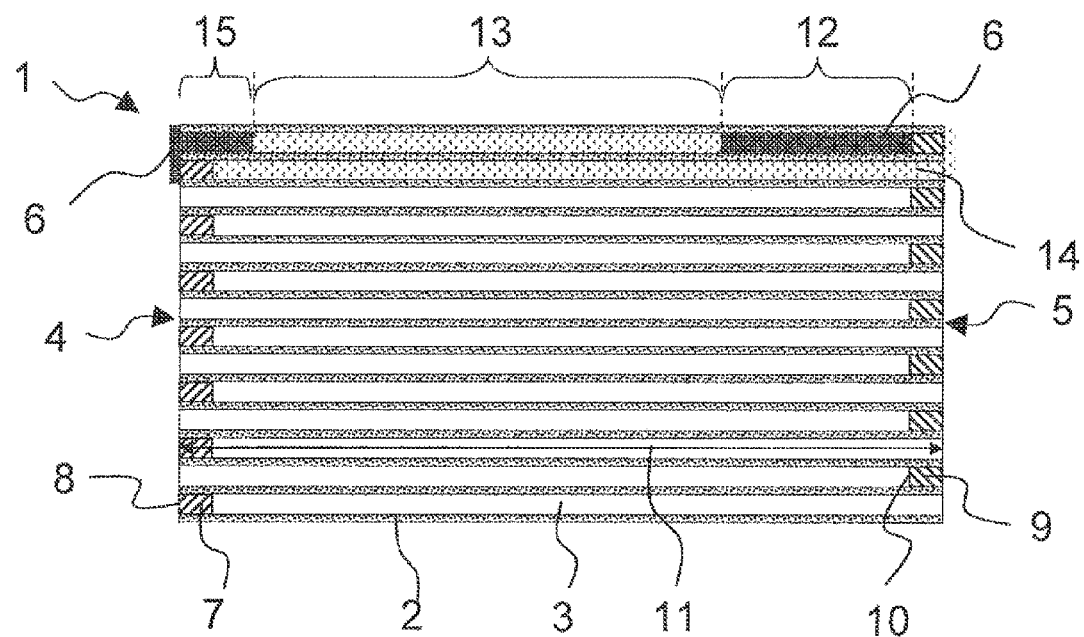
FIG. 2 is a longitudinal-sectional view of a further structural variant of a particle filter according to the invention.

FIG. 2 shows a longitudinal section of a further embodiment of a particle filter 1. It is possible in this case to see the porous walls 2, which form a multiplicity of channels 3 that run rectilinearly. Adjacent channels 3 are sealed off in an alternating manner at the first end side 4 or the second end side 5 by a closure device, in such a way that the exhaust gas entering at the first end side 4 is forced, in the channels 3, to pass through a porous wall 2. In this case, it is shown in the lower partial region of FIG. 2 that the front surfaces 8 of the first closure device 7 at the first end side 4 point in the same direction as base surfaces 10 of a second closure device 9 at the second end side 5.

Furthermore, several sections of the channels 3 are indicated in an upper partial region. The channels 3 basically have a predefined length 11 between the two end sides. As is shown for the channel 3 which is illustrated at the very top, the particle filter 1 has a hydrolysis coating 6 close to the first end side 4. That hydrolysis coating extends over the first end side 4 and into a third section 15 of the channel 3. A second section 13 of the channel, which is formed adjacent the third section 15, has an SCR coating 14 provided therein. A first section 12, which adjoins the second section 13 and extends up to the second closure device 9, again has a hydrolysis coating 6. An adjacent channel 3, in which a first closure device 7 is provided, is completely filled with an SCR coating 14. In this case, the SCR coating 14 also extends over the entire second end side 5 outside the channels 3.

Figure 3:
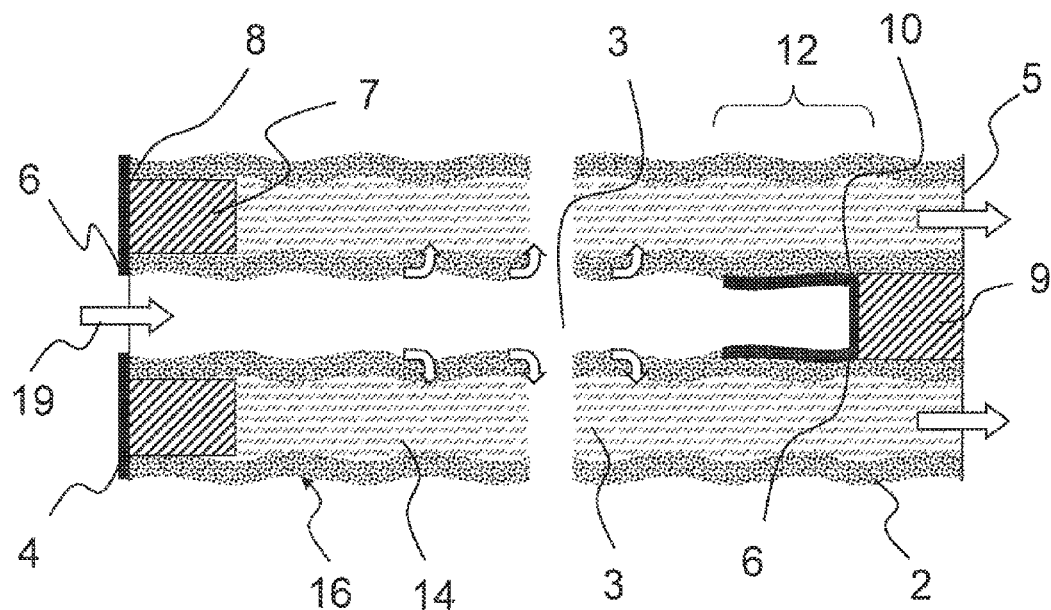
FIG. 3 is an enlarged, fragmentary, longitudinal-sectional view of a further structural variant of the particle filter.

FIG. 3 diagrammatically shows a portion of the particle filter 1 for a central channel 3, in which exhaust gas can flow-in in a predetermined flow direction 19. In this case, an inflow region is illustrated at the left and an outflow region is illustrated at the right. The first end side 4, with the hydrolysis coating 6, which also extends over the front surfaces 8 of the first closure device 7, is again thus shown at the left. The exhaust gas, and if appropriate a reducing agent as well, thus now enters into the centrally illustrated channel 3, wherein constituents of the reducing agent flying or flowing straight ahead impinge at the opposite end on a second closure device 9. The base surface 10 of the second closure device 9 as well as the walls 2 in a first section 12 directly adjoining the second closure device 9, are formed with a hydrolysis coating 6, in such a way that reducing agent droplets possibly impinging in this case, such as for example droplets of a urea-water solution, can be hydrolyzed. The reducing agent produced in this way, or ammonia, is forced together with the exhaust gas through the porous walls 2, as show by the arrows, and passes into adjacent channels 3, in which an SCR coating 14 is in turn provided. In this case, the channels 3 are additionally formed with a structure 16, in such a way that a curved, bulging or wavy profile of the channels 3 is realized.

Figure 4:
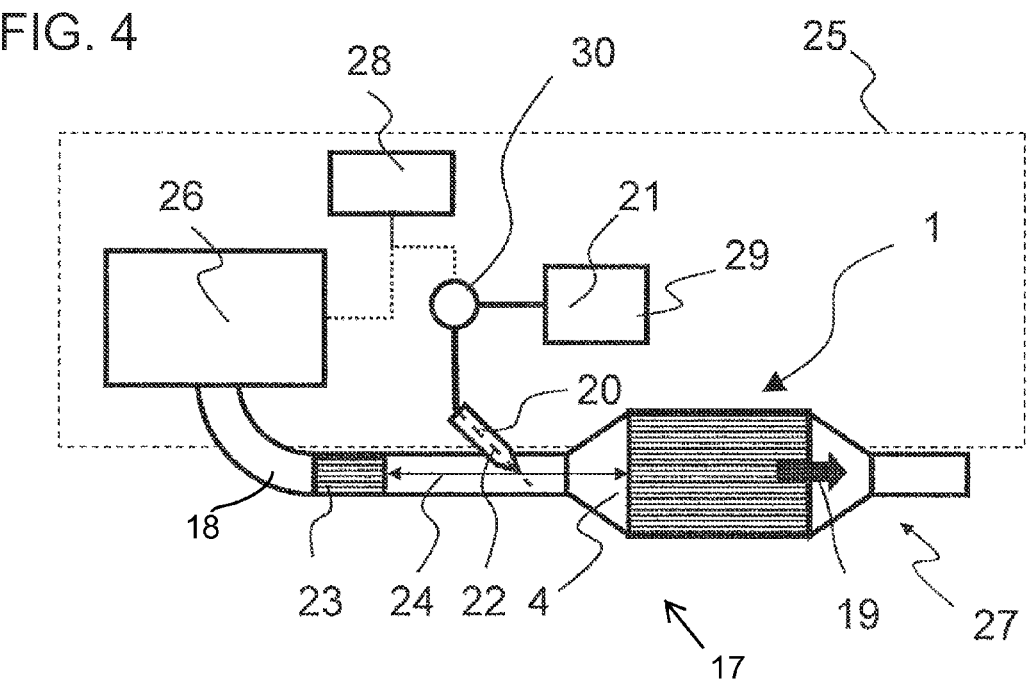
FIG. 4 is a plan view of a motor vehicle having a device for carrying out an SCR process.

FIG. 4 diagrammatically shows a motor vehicle 25 in which a device 17 for carrying out an SCR process is integrated. Exhaust gas produced in an internal combustion engine 26 (for example a diesel engine) flows through at least one exhaust line 18 of an exhaust system 27 in the flow direction 19 as indicated in this case. The exhaust gas thereby impinges firstly on an oxidation catalytic converter 23 which is positioned at a distance 24 of at least 150 mm from the particle filter 1. Furthermore, a nozzle 20 for introducing urea-water solutions, for example, is provided between the oxidation catalytic converter 23 and the particle filter 1. The nozzle 20 is inclined and thus injects reducing agent 21 with an injection direction 22 which is oblique with respect to the flow direction 19 and with respect to the first end side 4 of the particle filter 1. The reducing agent 21, in particular a urea-water solution, is stored in a tank 29 and can, if appropriate at the command of a controller 28 which is connected to the internal combustion engine 26, be metered through the nozzle 20 according to demand through the use of a dosing unit 30, for example in the form of a dosing pump.

The invention claimed is:

1. A particle filter, comprising:
    a first end side and a second end side;
    porous walls forming channels extending between said first end side and said first end side and said second end side, said porous walls defining webs having web front surfaces forming a part of said first end side; and
    a hydrolysis coating disposed at said first end side outside said channels;
    first closure devices for closing channels, said first closure devices disposed at said first end side, said first closure devices having respective front surfaces forming a part of said first end side, all of said respective front surfaces and all of said web front surfaces having said hydrolysis coating thereon.

2. The particle filter according to claim 1, which further comprises second closure devices for closing channels, said second closure devices disposed at said second end side, said second closure devices having respective base surfaces delimiting channels, and said base surfaces having said hydrolysis coating.

3. The particle filter according to claim 1, wherein said channels have a length with a first section extending to said second end side, and said channels have said hydrolysis coating over said first section of said length.

4. The particle filter according to claim 3, wherein said length of said channels has a second section disposed between said first end side and said second end side, and said channels have an SCR coating over said second section of said length.

5. The particle filter according to claim 4, wherein said length of said channels has a third section extending to said first end side, and said channels have said hydrolysis coating over said third section of said length.

6. The particle filter according to claim 1, wherein said channels have a length with a second section disposed between said first end side and said second end side, and said channels have an SCR coating over said second section of said length.

7. The particle filter according to claim 1, wherein said channels have a length with a third section extending to said first end side, and said channels have said hydrolysis coating over said third section of said length.

8. The particle filter according to claim 1, wherein at least some of said channels are at least partially curved or provided with structures projecting into said channels.

9. A device, comprising:
    at least one exhaust line for conducting an exhaust gas flow in a flow direction;
    a nozzle for introducing a reducing agent including or forming ammonia into said at least one exhaust line; and
    a particle filter according to claim 1, said first end side of said particle filter being directed toward said nozzle.

10. The device according to claim 9, wherein said nozzle is positioned to define an injection direction aligned obliquely relative to said first end side or to said flow direction of the exhaust gas.

11. The device according to claim 9, which further comprises an oxidation catalytic converter disposed in said at least one exhaust line, said oxidation catalytic converter being positioned upstream of said nozzle in said flow direction of the exhaust gas and at a distance of at least 150 millimeters from said particle filter.

12. A motor vehicle, comprising:
    an internal combustion engine; and
    an exhaust system receiving exhaust gas from said internal combustion engine, said exhaust system having a device according to claim 9.

13. A motor vehicle, comprising:
    an internal combustion engine; and
    an exhaust system receiving exhaust gas from said internal combustion engine, said exhaust system having at least one particle filter according to claim 1.

14. The particle filter according to claim 1, wherein at least some of said channels have said hydrolysis coating at said first end and said second end and an SCR coating extending over a length between said hydrolysis coating at said first end and said hydrolysis coating at said second end, said SCR coating interrupting said hydrolysis coating between.

15. The particle filter according to claim 1, wherein said channels having said closure devices only have an SCR coating thereon.

* * * * *